US012112276B2

(12) United States Patent
Hall

(10) Patent No.: US 12,112,276 B2
(45) Date of Patent: Oct. 8, 2024

(54) TRAINING CONVERSATIONAL COMPUTING INTERFACES WITH TRACED PROGRAMS

(71) Applicant: Microsoft Technology Licensing, LLC, Redmond, WA (US)

(72) Inventor: David Leo Wright Hall, Berkeley, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/064,475

(22) Filed: Dec. 12, 2022

(65) Prior Publication Data

US 2023/0104522 A1 Apr. 6, 2023

Related U.S. Application Data

(63) Continuation of application No. 16/593,850, filed on Oct. 4, 2019, now Pat. No. 11,526,780.

(60) Provisional application No. 62/883,032, filed on Aug. 5, 2019.

(51) Int. Cl.
*G06N 5/04* (2023.01)
*G06F 9/455* (2018.01)
*G06F 40/30* (2020.01)
*G06N 20/00* (2019.01)
*G10L 15/22* (2006.01)

(52) U.S. Cl.
CPC ........... *G06N 5/04* (2013.01); *G06F 9/45558* (2013.01); *G06F 40/30* (2020.01); *G06N 20/00* (2019.01); *G06F 2009/45591* (2013.01); *G10L 15/22* (2013.01); *G10L 2015/223* (2013.01)

(58) Field of Classification Search
CPC .......... G06N 5/04; G06N 20/00; G06F 40/30; G06F 9/45558; G06F 2009/45591; G10L 15/22; G10L 2015/223
USPC ........................................................... 706/12
See application file for complete search history.

(56) References Cited

U.S. PATENT DOCUMENTS

| | | | | |
|---|---|---|---|---|
| 10,402,305 B2* | 9/2019 | Nagao | ................. | G06F 9/30076 |
| 10,922,357 B1* | 2/2021 | Chennuru | ........... | G06F 16/2457 |
| 10,991,242 B2* | 4/2021 | Taylor | ...................... | H04Q 9/00 |
| 11,206,229 B2* | 12/2021 | Singaraju | ............... | G06N 3/008 |
| 2011/0314342 A1* | 12/2011 | Gilkerson | ........... | G06F 9/30145 |
| | | | | 714/E11.029 |
| 2015/0095715 A1* | 4/2015 | Nagao | ................. | G06F 11/3636 |
| | | | | 714/45 |
| 2015/0277861 A1* | 10/2015 | Jennings | ................... | G06F 8/41 |
| | | | | 717/148 |
| 2017/0337813 A1* | 11/2017 | Taylor | .................. | G05D 1/0285 |

(Continued)

*Primary Examiner* — William D Titcomb
(74) *Attorney, Agent, or Firm* — Alleman Hall & Tuttle LLP

(57) ABSTRACT

A method of extending a conversational computing interface comprises obtaining data-flow traces indicating computational steps that occur based on execution of a nonnative skill implemented in a nonnative programming language of the conversational computing interface. A native computer-executable plan is automatically generated. The generated native computer-executable plan represents the data-flow traces in a native programming language of the conversational computing interface. The conversational computing interface is automatically trained based on the native computer-executable plan and a conversational event associated with the native computer-executable plan.

20 Claims, 4 Drawing Sheets

(56) References Cited

U.S. PATENT DOCUMENTS

2019/0212879 A1\* 7/2019 Anand .................. G06Q 50/10
2019/0311036 A1\* 10/2019 Shanmugam ........... G06F 40/56
2019/0347668 A1\* 11/2019 Williams ............... G06N 5/046

\* cited by examiner

TRAINING CONVERSATIONAL COMPUTING INTERFACES WITH TRACED PROGRAMS

CROSS REFERENCE TO RELATED APPLICATIONS

This application is a continuation of U.S. Non-Provisional patent application Ser. No. 16/593,850, filed Oct. 4, 2019, which claims priority to U.S. Provisional Patent Application Ser. No. 62/883,032, filed Aug. 5, 2019, the entirety of each of which is hereby incorporated herein by reference for all purposes.

BACKGROUND

Conversational computing interfaces that utilize machine learning or other artificial intelligence techniques may be trained to respond to different kinds of user utterances. More particularly, a conversational computing interface may be trained to execute a particular skill in response to a corresponding user utterance. As an example, the conversational computing interface may be trained to query a network-accessible weather service for tomorrow's weather report responsive to a user saying, "What'll the weather be like?" Traditionally, skills are programmed for a particular conversational computing interface, such that skills programmed for one conversational computing interface are not useable by a conversational computing interface having a different architecture.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method of extending a conversational computing interface comprises obtaining data-flow traces indicating computational steps that occur based on execution of a nonnative skill implemented in a nonnative programming language of the conversational computing interface. A native computer-executable plan is automatically generated. The generated native computer-executable plan represents the data-flow traces in a native programming language of the conversational computing interface. The conversational computing interface is automatically trained based on the native computer-executable plan and a conversational event associated with the native computer-executable plan.

DETAILED DESCRIPTION

Figure 1A:
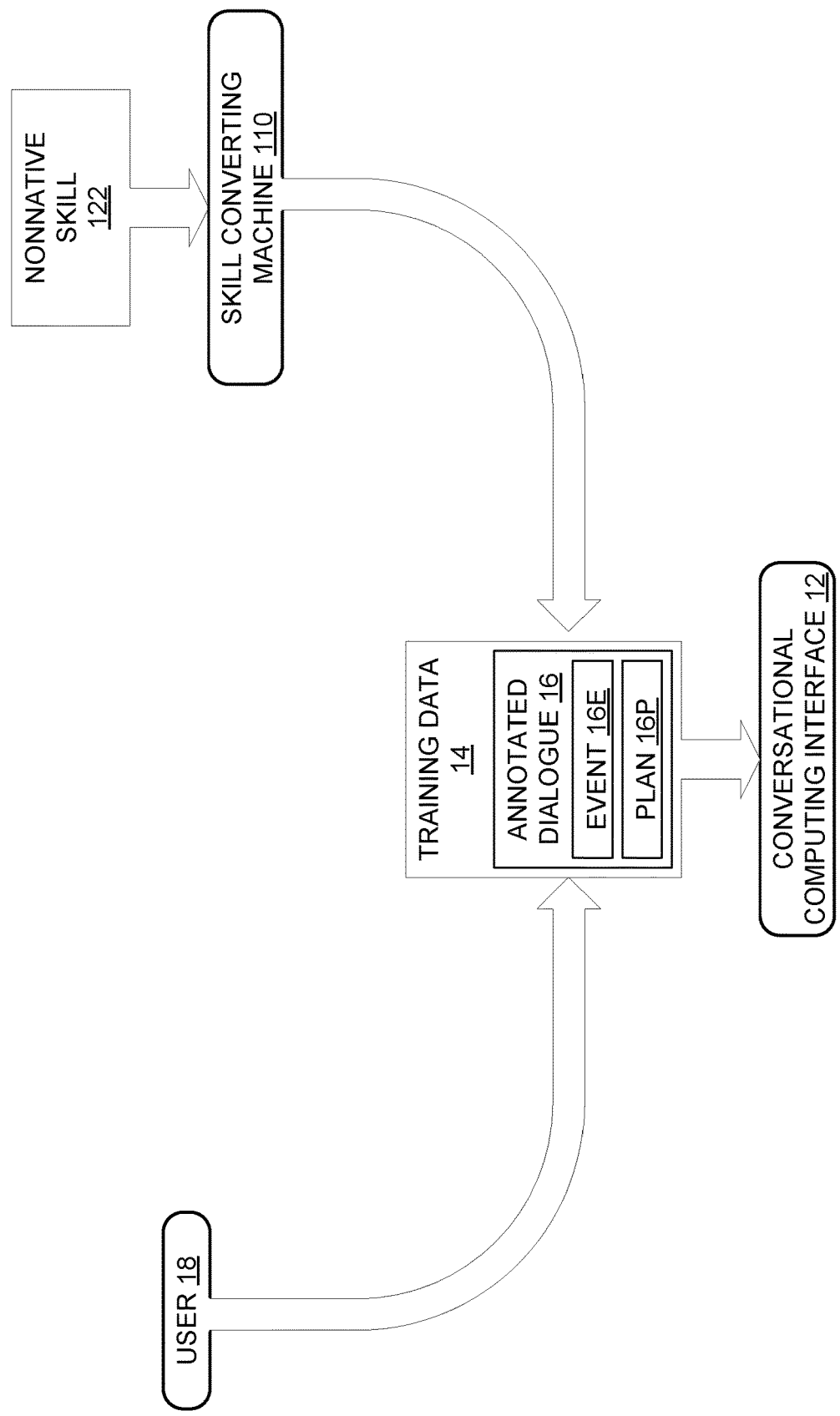
FIG. 1A shows an exemplary architecture for training a conversational computing interface.

Conversational computing interfaces enable human users to interact with computers in a more natural manner. A properly trained conversational computing interface is able to process natural user interactions such as spoken user utterances or written user commands, without requiring the user to use a particular syntax defined by the computer. This allows the human user to use natural language when addressing the computer. For example, the user may interact using natural language by asking the computer to answer a question or by giving the computer a command. In response, the conversational computing interface is trained to automatically perform actions, such as answering questions or otherwise assisting a user (e.g., reporting today's weather forecast in response to the human saying or typing "What is the weather like?"). Conversational computing interfaces may be configured to respond to any suitable user interaction event(s) that may be detected by a computer with any suitable input devices/sensors. Non-limiting examples of events include user utterances in the form of speech and/or text, button presses, network communication events (e.g., receiving a result of an application programming interface (API) call), and/or gesture inputs. More generally, events include any occurrences that may be relevant to user interaction and that are detectable by a conversational computing interface, for example via input/output hardware (e.g., microphones, cameras, keyboards, and/or touch-screens), communication hardware, and the like.

Conversational computing interfaces may be configured to perform any suitable actions to assist a user. Non-limiting examples of actions include performing computations, controlling other computers and/or hardware devices, (e.g., by invoking an API), communicating over networks (e.g., to invoke an API), receiving user input (e.g., in the form of any detectable event), and/or providing output (e.g., in the form of text and/or speech). More generally, actions may include any behaviors that a computer system is configured to perform. Other non-limiting examples of actions include controlling electronic devices (e.g., turning on/off lights in a user's home, adjusting a thermostat, and/or playing multimedia content via display/speakers), interacting with commercial and/or other services (e.g., invoking an API to schedule a ride via a ride-hailing service and/or ordering food/packages via a delivery service), and/or interacting with other computer systems (e.g., to access information from a website or database, send an email, and/or access a user's schedule in a calendar program).

Accordingly, by recognizing various events and in response, performing relevant actions, conversational computing interfaces enable users to use conversation, gesture, and other modes of expression to control a computer to perform any suitable tasks. Actions for performing different tasks may be represented in any suitable format that may be interpreted by a computer to cause the computer to perform some suitable action. In some examples, conversational computing interfaces may support a finite plurality of predefined actions, which sometimes are referred to as "templates" or "skills." For example, each of the plurality of hard-coded actions may be associated with computer-executable code for causing a computer to perform pre-defined steps associated with the action. For example, a conversational computing interface may support a predefined plurality of hard-coded templates, where each template has a number of slots that can be filled to parametrize a hard-coded action, such as invoking an API, e.g., to reserve a seat at a restaurant, call a ride-hailing service, and/or look up the weather. However, although conversational computing interfaces may support a plurality of different predefined actions via the predefined templates, a conversational computing interface that only supports predefined actions via templates may not be configured to perform more complex or novel behaviors.

More generally, conversational computing interfaces may be configured to recognize various events, and to perform various actions in response to events by generating a computer-executable plan. "Plan" is used herein to refer to any suitable representation of steps that may be taken by a computer in order to perform an action (e.g., computer-executable code, such as computer-executable bytecode in a data-flow programming language that is executable to cause a computer to perform computational steps related to the action, and/or a computer-readable trace). "Trace" is used herein to refer to any suitable record of the results of performing an action, for example, indicating computational steps that were executed to perform an action and/or results of performing such computational steps.

In some examples, conversational computing interfaces may be trained on annotated dialogues. "Annotated dialogue" is used herein to refer to any suitable representation of an exemplary conversation between a human and a conversational computing interface (e.g., a dialogue), including any suitable annotations indicating actions that were taken by the conversational computing interface in response to events in the conversation. Generally speaking, annotations may include anything that is associated with an event (e.g., an utterance or other input from a human user participating in a dialogue), including but not limited to plans, results, traces, and/or any suitable metadata (e.g., metadata indicating context in which the dialogue takes place or metadata indicating user satisfaction with a plan).

An annotated dialogue may indicate desired behavior for a conversational computing interface, for example by including possible events that could occur in a conversation, along with an indication of actions that should be taken in order to respond to the events. As a result of training on annotated dialogues, a conversational computing interface may be configured to respond to an event that occurs in a conversation with an appropriate action. For example, the conversational computing interface may be trained to reproduce an action that was taken in response to the event in an annotated dialogue. As another example, the conversational computing interface may be trained to generate an action specifically for responding to the event, where the action was not necessarily indicated in any annotated dialogue. For example, the conversational computing interface may be trained to generate actions for events that were not included in any annotated dialogue, for example by generating an action that is similar to an action that was taken for some other event in an annotated dialogue.

For example, FIG. 1A shows a system 10 for training an exemplary conversational computing interface 12. Conversational computing interface 12 may be trained using training data 14 including one or more annotated dialogue(s) 16. For example, an annotated dialogue 16 may include at least an event 16E and a computer-executable plan 16P for responding to the event 16E. Annotated dialogue(s) 16 may be collected in any suitable manner, e.g., from historical data and/or generated by simulation. In some examples, an annotated dialogue 16 may be obtained from human user 18. For example, training data 14 may be obtained from human users including human demonstrators, human engineers, and/or human users of a live conversational system, who may be instructed to provide exemplary events and/or actions for responding to the exemplary events. Annotated dialogues may include events and actions in any suitable computer-readable representation.

The conversational computing interface 12 may be trained to take specific actions in response to different kinds of events, for example, to respond to a user request by outputting speech utterances via a speaker, and/or to interact with other computer technologies via APIs to find search results, make purchases, schedule appointments, etc. The conversational computing interface may be trained in any suitable fashion based at least on training data including annotated dialogue(s) 16, for example, by supervised training wherein the conversational computing interface is trained to achieve similar results to the annotated dialogues, and/or by reinforcement learning wherein the conversational computing interface is trained to assess the likely utility of different possible actions based on feedback regarding the actual utility of different possible outcomes that occurred in annotated dialogues and/or during live operation of the conversational computing interface. The examples described herein are non-limiting, and the conversational computing interface may be trained on annotated dialogues in any suitable fashion, for example using any suitable combination of state-of-the-art and/or future machine learning (ML), artificial intelligence (AI), and/or natural language processing (NLP) technologies.

For example, event 16E may include user utterance text, enumerated values indicating recognized events such as button presses, gestures, and/or parameter values associated with recognized events such as coordinate values associated with touch inputs and gestures. It may be relatively easy and/or inexpensive (e.g., in terms of computational expense and/or monetary expense) to obtain events for annotated dialogues, for example by asking trained and/or untrained human user(s) 18 to generate events by interacting with a real and/or simulated conversational computing interface.

Actions may include a computer-executable plan 16P, as described above. Accordingly, by training on annotated dialogues including exemplary event(s) 16E and exemplary computer-executable plan(s) 16P, a conversational computing interface 12 may be configured to generate suitable computer-executable plans for various events. The conversational computing interface 12 may be trained to generate novel and/or complex computer-executable plans for events that did not occur in the training data, so as to generalize the training from the exemplary annotated dialogue 16 provided in training data 14 to other, similar and/or dissimilar situations.

However, achieving satisfactory performance of the conversational computing interface 12 based on training on annotated dialogues may be at least partially dependent on having sufficiently many examples of diverse events and computer-executable plans. For example, the conversational computing interface may be unable to perform actions that are very dissimilar from all of the actions occurring in the training data. As an example, if training data for a conversational computing interface does not include any computer-executable plans for sending an email via an email program, the conversational computing interface may be unable to infer how to generate appropriate computer-executable code to send an email. For example, sending an email may require interacting with a specific email API using API-specific programming conventions. Although the conversational computing interface may be trained to generalize between different situations, the conversational computing interface may not be able to infer such API-specific information based only on the information given to the system during training. For example, the email API programming conventions may be completely unrelated to any of the exemplary events/actions given to the system during training. In particular, even when exemplary events are available, the system may fail to achieve sufficient performance on diverse events if suitable actions have not already been developed into suitable computer-executable plans.

As such, even when conversational computing interfaces are configured to generate computer-executable plans for events, the conversational computing interfaces may be limited based on the computer-executable plans that are available to the system during training. Furthermore, there may be a cost (e.g., in terms of financial expense and/or human labor time) to define computer-executable plans for many different events. For example, defining a suitable computer-executable plan for an event may require conceptually difficult engineering (e.g., performed by skilled/trained human engineers), domain-specific knowledge (e.g., API programming conventions, task-specific "business logic" related to transactions, human communications, and/or scheduling), and/or familiarity with conversational computing interfaces (e.g., familiarity with the format, conventions, and/or capabilities of the computer-executable plans supported by a conversational computing interface).

Accordingly, the present disclosure includes systems and methods for obtaining exemplary computer-executable plan(s) 16P for a conversational computing interface 12, based on other programs that do not need to be specific to the conversational computing interface, herein referred to as "nonnative skills" and "nonnative skills of a conversational computing interface." Such "nonnative skills" include any program that may not adhere to the particular programming conventions established for the conversational computing interface, e.g., a program in a nonnative programming language for which the conversational computing interface is not configured to generate and/or execute programs.

For example, FIG. 1A shows a configuration in which a skill converting machine 110 is configured to receive a nonnative skill 122, and to output training data 14, including a native plan 16P and optionally further including an event 16E associated with the native plan. Accordingly, skill converting machine 110 may be used to obtain one or more of native plan 16P, event 16E, and/or annotated dialogue(s) 16 (e.g., annotated dialogue 16 incorporating native plan 16P and event 16E) for training conversational computing interface 12. Skill converting machine 110 may be used to convert nonnative skills into suitable training data 14, instead of or in addition to receiving training data 14 from human user(s) 18. In some examples, it may be costly and/or conceptually difficult for human users(s) 18 to provide native plan 16P for training conversational computing interface 12, even if it is relatively inexpensive and/or conceptually easier for human user(s) 18 to provide event 16E for training conversational computing interface 12. Accordingly, skill converting machine 110 may be used to provide native plan 16P while human user(s) 18 provide event 16E associated with native plan 16P. In some examples, skill converting machine 110 may be used to provide complete annotated dialogue 16, so that training data 14 may be obtained without necessarily requiring any participation/intervention by human user(s) 18.

Figure 1B:
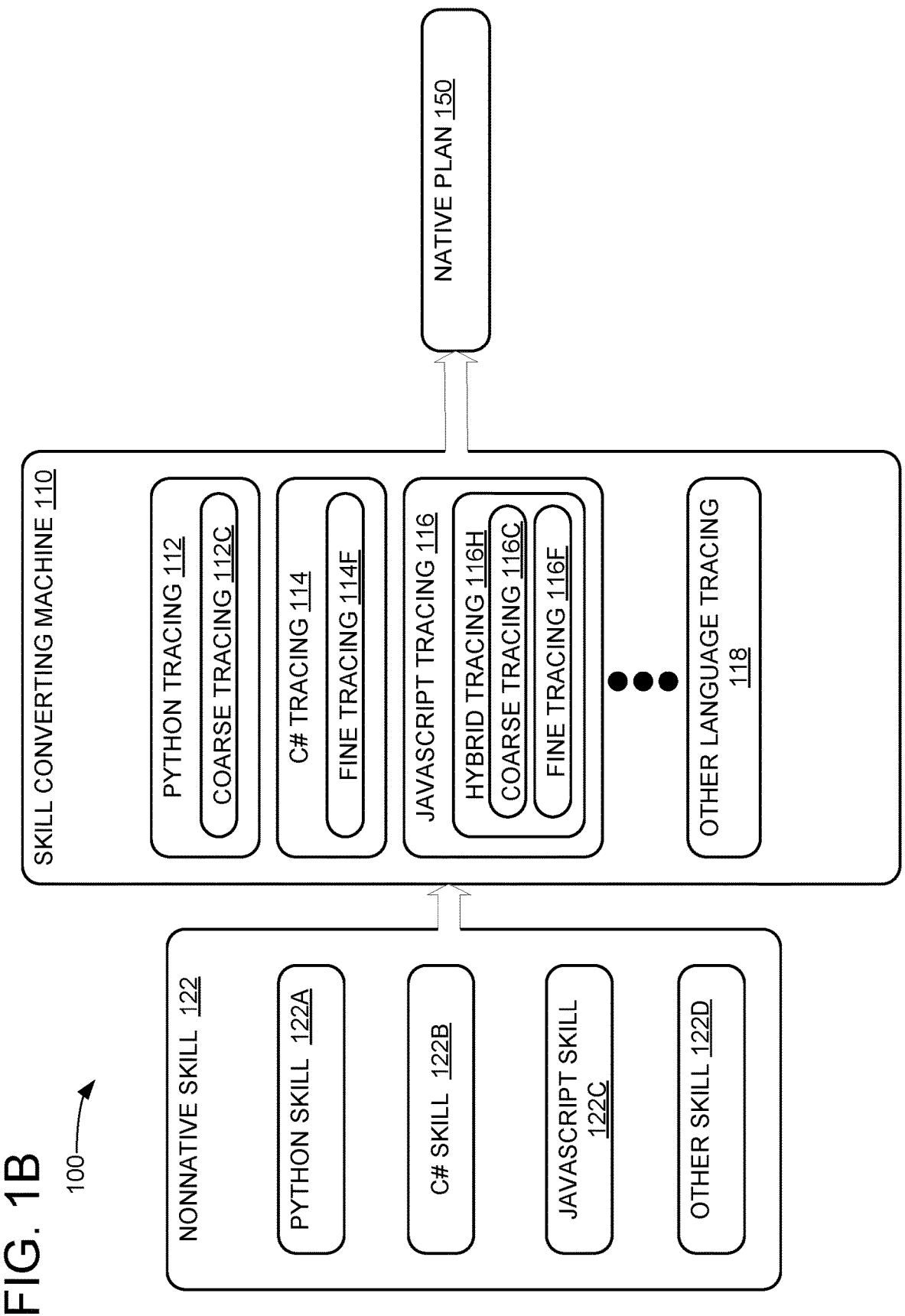
FIG. 1B shows an exemplary architecture for translating a nonnative skill into a computer-executable plan for a conversational computing interface.

FIG. 1B shows a system 100 including a skill converting machine 110 configured to convert a nonnative skill 122 that is incompatible with a particular conversational computing interface into a native plan 150 that is compatible with the particular conversational computing interface. For example, system 100 is configured to produce a native plan 150 based on executing the nonnative skill 122.

Nonnative skill 122 may include any suitable implementation for performing an action. For example, nonnative skill 122 may include a Python skill 122A implemented in the Python programming language. Alternately or additionally, nonnative skill 122 may include a C# skill 122B implemented in the C# programming language, a JavaScript skill 122C implemented in the JavaScript programming language, and/or any other skill 122D (e.g., implemented with any suitable programming techniques, in any suitable programming language).

The native plan 150 indicates steps taken by the nonnative skill, in a format that is interpretable by the conversational computing interface (e.g., in a data-flow programming language specific to the conversational computing interface, and/or in a trace format for recording operations in the data-flow programming language). The native plan 150 output by skill converting machine 110 may be used as a computer-executable plan for training the conversational computing interface. Skill converting machine 110 traces the steps taken by nonnative skills by executing them in a specialized environment and/or observing the execution of the nonnative skills by any other machine and/or computing device. The specialized environment is configured to permit the nonnative skills to run, while recording the calculation of values, other computer operations (e.g., disk access, memory access, command-line input/output, and/or GUI input/output) and other computational steps by the nonnative skills. Different kinds of programs may be traced at different levels of detail (e.g., ignoring and/or summarizing some computational steps), by using a coarse tracing approach, a fine tracing approach, and/or a hybrid tracing approach, as will be described below. In some examples, skill converting machine 110 traces steps taken by a nonnative skill by executing the skill and observing the results of the execution. In other examples, skill converting machine 110 may delegate the execution of the nonnative skill to a different machine (e.g., to a different computer device) and observe the results of the execution based on signals received from the different machine. For example, skill converting machine 110 may be configured to observe execution of the nonnative skill by coupling to the different machine and instructing the different machine to execute the nonnative skill and to output signals indicating each step taken during such execution. As non-limiting examples, skill converting machine 110 may be configured to observe execution of nonnative skills at another machine via a serial port connection to the other machine, and/or via communicatively coupling with the other machine via a computer network. Although the present disclosure may describe tracing of nonnative skills with regard to executing those skills on skill converting machine 110, the examples presented herein are non-limiting and the techniques of the present disclosure may be applied with any suitable tracing technique, including executing nonnative skills by skill converting machine 110, and/or executing nonnative skills at any other machine and observing such execution by skill converting machine 110.

Native plan 150 may be defined in any suitable format, for example as a computer-executable plan in a format specific to a particular conversational computing interface. As an example, the native plan 150 may include a data-flow trace indicating values that were computed by the nonnative skill 122, in a native format (e.g., in a format defined by a native programming language of the conversational computing interface). For example, the data-flow trace may indicate all of the computational steps that actually occurred when executing the nonnative skill 122. As another example, a computer-executable plan may include a data-flow program in a data-flow programming language specific to the conversational computing interface (e.g., source code and/or bytecode). For example, the data-flow program may indicate, for each computational step that occurred when executing the nonnative skill 122, one or more programming language constructs that may be executed to cause a computer to perform that computational step. In some examples, computer-executable plans may include programming language elements specific to training and/or operating the conversational computing interface, for example, operations for receiving input utterances, and/or operations for searching a dialogue history of previous interactions with a particular user to find information related to the previous interactions. Accordingly, "nonnative programming language" may refer to any programming language other than programming language(s) associated with a particular conversational computing interface.

For example, skill converting machine 110 is configured to trace nonnative skills in one or more different programming languages. An exemplary nonnative skill 122 may include one or more skills implemented in any suitable nonnative programming languages, for example a Python skill 122A, a C# skill 122B, a JavaScript skill 122C, and/or any other language skill 122D in any suitable non-native language. Accordingly, skill converting machine 110 includes a Python tracing machine 112 for tracing skills implemented in the Python programming language (e.g., Python skill 122A), a C# tracing machine 114 for tracing skills implemented in the C# programming language (e.g., C# skill 122B), and a JavaScript tracing machine 116 for tracing skills implemented in the JavaScript programming language (e.g., JavaScript skill 122C). Although skill converting machine 110 is shown in a configuration suitable for tracing programs in Python, JavaScript, and/or C#, skill converting machine 110 may alternately or additionally be configured to trace skills implemented in other programming languages, for example Java and/or C. For example, skill converting machine 110 may be further configured to trace programs in any other suitable programming language, e.g., using other language tracing machine(s) 118 configured to trace other language skills 122D implemented in any other nonnative language.

In some examples, other language skill 122D is a legacy skill, for example a non-conversational computer program, and/or a skill of a conversational computing interface (e.g., a pre-defined action, a template, and/or any other action supported by a previous and/or current version of the conversational computing interface). "Legacy" may refer to any skills, computer programs, and/or conversational computing interfaces that are not compatible with native plans (e.g., skills of a previous and/or outdated version of a conversational computer interface using nonnative skills, and/or any other conversational computing interface using nonnative skills). In some examples, a conversational computing interface that allows interaction through legacy skills (e.g., by supporting specific assistive tasks through a pre-defined selection of legacy skills) may be referred to as a legacy automated assistant. For example, a legacy skill may be a skill of a legacy automated assistant that is configured with a predefined selection of legacy skills. For example, skill converting machine 110 may be configured to record the reception of input utterances by the conversational computing interface, steps taken by the conversational computing interface in response to receiving the input utterances, and/or output utterances by the conversational computing interface. The legacy skill may include one or more programs in different programming languages. Accordingly, skill converting machine 110 may trace the legacy skill by tracing each of the one or more programs with a corresponding tracing machine (e.g., tracing programs with Python tracing machine 112, JavaScript tracing machine 116, C# tracing machine 114, and/or other language tracing machine(s) 118). Legacy skills may be used to add functionality to a native conversational computing interface to more flexibly respond to different utterances. In some examples, the legacy skills of a native conversational computing interface may be used as training data for a code generator of the same native conversational computing interface. Alternately or additionally, the legacy skills of a first, legacy or nonnative conversational computing interface may be used as training data for a code generator of a second, different native conversational computing interface.

Figure 1C:
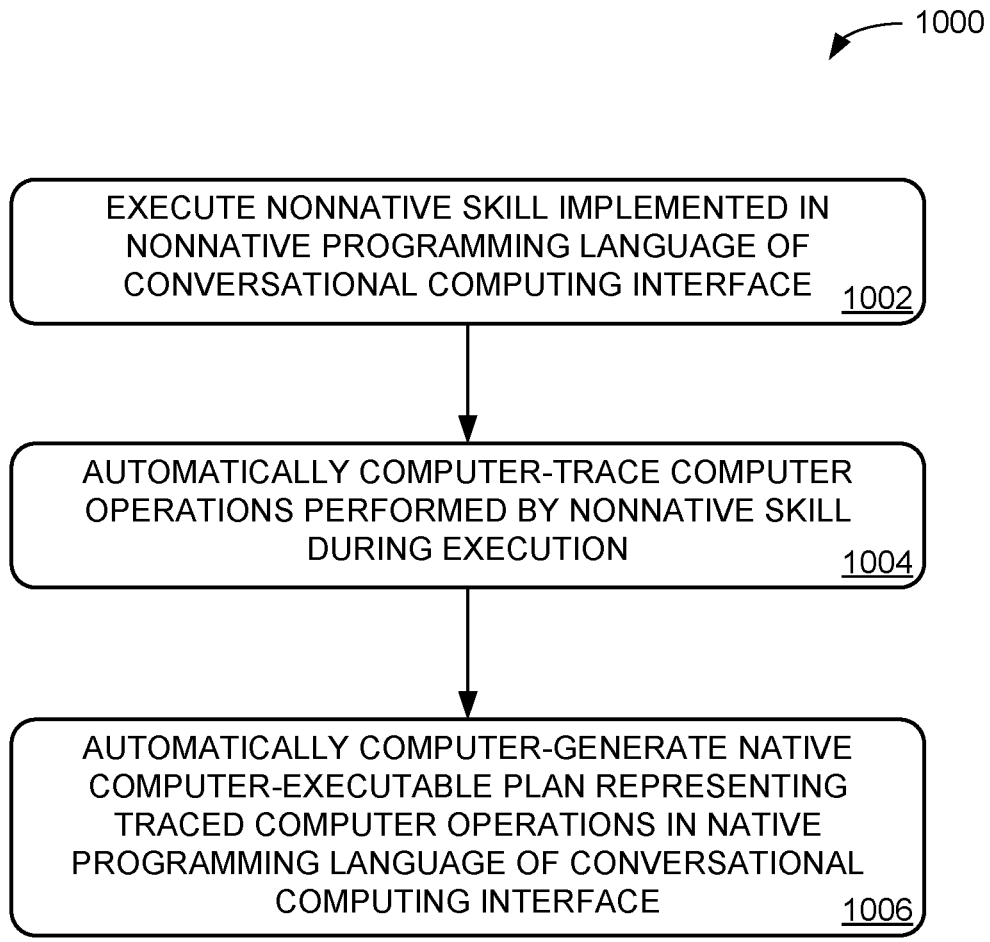
FIG. 1C shows an exemplary method for extending a conversational computing interface.

The techniques of the present disclosure may be used to extend a conversational computing interface in any suitable fashion, for example for generating training data including native computer-executable plans. Accordingly, FIG. 1C shows an exemplary method 1000 of extending a conversational computing interface. At 1002, method 1000 includes executing a nonnative skill implemented in a non-native programming language of the conversational computing interface. At 1004, method 1000 includes automatically computer-tracing computer operations performed by the nonnative skill during such execution. At 1006, method 1000 further includes automatically computer-generating a native computer-executable plan representing the traced computer operations in a native programming language of the conversational computing interface.

Tracing machines for a particular language may trace operations involved in the execution of a program at any suitable level of granularity. As an example, the present disclosure includes an exemplary coarse grain approach, an exemplary fine grain approach, and a hybrid approach that incorporates aspects of the coarse grain approach and the fine grain approach. For example, as shown in FIG. 1B, Python tracing machine 112 uses a coarse grain tracing approach 112C, while C# tracing machine 114 uses a fine grain tracing approach 114F, and JavaScript tracing machine 116 uses a hybrid tracing approach 116H that incorporates a coarse grain tracing approach 116C and a fine grain tracing approach 116F. The examples shown in FIG. 1B are non-limiting, and coarse, fine, and/or hybrid approaches may be implemented for various programming languages. Furthermore, exemplary techniques for implementing coarse, fine, and hybrid approaches are described herein. However, tracing machines according to the present disclosure may be implemented for a programming language in any suitable fashion, for example using other finer- or coarser-grained approaches not disclosed herein.

The coarse, fine, and hybrid approaches all include receiving a nonnative skill (e.g., a program in a nonnative programming language) as input, and outputting a native plan 150. Native plan 150 records computational steps involved in the execution of the nonnative skill. Native plan 150 may include any suitable computational steps from the execution, for example, low-level operations (e.g., memory accesses, arithmetic operations, jump/branch operations, hardware operations), control flow and data flow constructs (e.g., loops, conditionals, variable assignments, function calls), and/or high-level programming idioms (e.g., API accesses and/or application-specific business logic).

In some examples, for coarse, fine, and/or hybrid approaches, native plan 150 may omit, summarize, and/or abstract details of the execution. For example, the exact order and timing of steps in the execution of the nonnative skill may be omitted, so as to instead represent data-flow with regard to dependencies among return values of the nonnative skill (e.g., ordering steps in the program according to a topological ordering of a data-flow graph defined by the dependencies among the return values). In some examples, low-level steps of execution of the nonnative skill may be omitted from the native plan 150. In some examples, control flow constructs (e.g., conditional jumps/branches and/or loops) may be omitted from the native plan 150. For example, the native plan 150 may represent the unconditional evaluation of one or more return values in dependency order, while omitting the specific ordering and/or control flow of computational steps.

In some examples, alternately or in addition to representing computational steps that are performed, native plan 150 may represent specific results of performing such computational steps, for example, return values and/or other computer operations (e.g., values stored in memory and/or values output to a screen). In some examples, the native plan 150 may include an assertion indicating that one or more computational steps only need to be evaluated if a condition holds (e.g., indicating that the one or more computational steps have a data-flow dependency related to the condition). Accordingly, native plan 150 may indicate that certain steps are only executed conditionally. In some examples, even when native plan 150 omits control flow constructs and other low-level features as described above, a conversational computing interface trained on native plan 150 and other data-flow traces generated by skill converting machine 110 may learn to appropriately perform computational steps only in appropriate conditions, by learning to generate appropriate assertions regarding preconditions/dependencies of the computational steps. Similarly, native plan 150 may omit control-flow constructs such as loops, while recording the steps that occurred when such control-flow constructs were actually executed (e.g., the "unrolling" of a loop including the code executed during each iteration of the loop that was executed), and based on training data including various combinations of steps (e.g., various loop unrollings representing different numbers of iterations for iterative constructs), the conversational computing interface may learn to appropriately generate appropriate code (e.g., code for executing an appropriate number of iterations for iterative constructs).

In some examples, automatically computer-tracing computer operations performed by a nonnative skill includes automatically computer-tracing the computer operations via a coarse grain tracing approach that automatically records when the nonnative skill calls a function of a predefined plurality of functions, and automatically records results of calling the function. Accordingly, the present disclosure includes an exemplary coarse grain tracing approach based on creating proxy objects that serve as wrappers for nonnative programming language functionality. For example, a predefined plurality of functions may be tracked by creating a proxy object for each function of the predefined plurality of functions. For example, the coarse grain tracing approach may be used for coarse grain tracing approach 112C of Python tracing machine 112, and/or coarse grain tracing approach 116C used in the hybrid tracing approach 116H of JavaScript tracing machine 116.

A proxy object for a nonnative programming language function is a wrapper object (e.g., a wrapper function, a wrapper class, and/or any other suitable programming language abstraction for encapsulating behavior of a function or behavior), configured to evaluate a value (e.g., by calling a function) in the nonnative programming language. The proxy object is configured to record the result of calling the function. In some examples, the proxy object is configured to save the result of calling the function as a new proxy object, representing a resulting value that may be further utilized in the nonnative programming language. Proxy objects are configured to replace like-named function names and/or variable names in the classical language, so that whenever the like-named functions would be called and/or variables evaluated, the proxy object is invoked and accordingly records the occurrence of the evaluation and the resulting value. Proxy functions may record any suitable parameters, for example, timing of the function call, parameters of the function call, or contextual information (e.g., other proxy values that were recorded and that may be relevant to the function call). A proxy object may be created for any function or variable of interest so as to record the evaluation of the function or variable. For example, proxy objects may be created for programming library functions and/or API functions. By recording the name, parameters, return values of functions, and/or results of variable evaluation, proxy objects may capture high-level data flow of a program.

Proxy objects may be configured to replace functions and/or variables in any suitable manner. For example, for a compiled nonnative programming language, proxy objects may be installed by configuring the compiler to inline the proxy objects as a replacement for like-named functions for code other than the proxy object that invokes said functions (e.g., so that the proxy object implementation is the only place where the original function call is used, as the compiler does not inline the replacement call). Alternately or additionally, proxy objects may be installed by configuring the linker to link function invocations to the proxy objects instead of to like-named functions. As another example, for an interpreted nonnative programming language, proxy objects may be installed by configuring the interpreter to access the proxy objects instead of the like-named functions and/or variables. As another example, for a nonnative programming language that is executed in a virtual machine, proxy objects may be installed by configuring the virtual machine to execute proxy object code in place of function calls and/or variable evaluation. As another, more general example, for any suitable nonnative programming language, proxy objects may be installed by automatically editing the high-level source code to replace function calls and/or variable names with evaluation of proxy objects.

In some examples, automatically computer-tracing the computer operations performed by the nonnative skill includes automatically computer-tracing the computer operations via a fine grain tracing approach that automatically records computational events in an execution environment associated with the nonnative skill. Accordingly, the present disclosure includes an exemplary fine grain tracing approach based on tracing computational events in an execution environment for a nonnative skill. For example, the fine grain tracing approach may be used for fine grain tracing approach 114F of C# tracing machine 114, and/or fine grain tracing approach 116F used in the hybrid tracing approach 116H of JavaScript tracing machine 116.

Execution environments may be traced in any suitable fashion. Execution environment refers herein to any computational resources involved in the execution of a nonnative skill, e.g., computer processor and/or memory state, virtual machine state, interpreter state, hard disk state, and/or networking hardware state. Various programs and/or programming languages may be configured for execution in particular environments. Accordingly, a fine grain tracing approach may be developed for any suitable environment. For example, when the nonnative skill includes a program configured for execution in an execution environment defined by a virtual machine, the fine grain tracing approach may be implemented via configuring the virtual machine to automatically record each instruction executed by the virtual machine. Similarly, when the nonnative skill includes a program configured for execution in an execution environment defined by an interpreter, the fine grain tracing approach may be implemented via configuring the interpreter to automatically record each instruction executed by the interpreter. Alternately or additionally, when the nonnative skill includes a program configured for execution in an execution environment associated with a computer processor, the fine grain tracing approach may include automatically recording each machine instruction executed by the computer processor.

For example, programs (e.g., Python programs and/or JavaScript programs) may be executed via an interpreter. For example, the interpreter may be configured to evaluate one or more operations in the program, for example, stepping through operations, function calls, and other computational constructs of the program one at a time in the order defined by the source code. In some examples, the interpreter may interpret source code directly. In other examples, the interpreter may interpret a byte-code based on the source code. A fine grain approach for tracing a program executed by an interpreter may include modifying the interpreter to record each computational step carried out in executing the program. For example, the interpreter may be configured to record low-level operations and/or function calls. Accordingly, the fine grain approach may track every computational step that is executed by the interpreter as such steps occur.

In other examples, programs may be compiled (e.g., ahead-of-time and/or just-in-time compiled) and executed by a virtual machine (e.g., C# programs, Python programs, and/or JavaScript programs may be executed by a virtual machine). Similar to interpreters, a virtual machine may be configured for fine grain tracing by recording each operation performed by the virtual machine. For example, the virtual machine may be configured to record each instruction (e.g., byte-code instructions) as the instruction is executed. In some examples, the virtual machine may be configured to recognize and record control-flow constructs, for example, loops, function calls, and/or conditionals. In some examples, the virtual machine may recognize low-level operations (e.g., memory accesses and/or arithmetic).

As another example, a compiled C program may be executed by loading executable machine code into a portion of computer memory and configuring a processor to execute the machine code starting at a particular address in the computer memory. For the compiled C program or any similar program that is compiled into C code and executed by a processor directly, a fine grain tracing approach may include configuring the compiler, linker, and/or hardware to record the occurrence of computational steps defined relative to the C source code (e.g., similar to the source-code tracing information added when compiling a code for debugging with a debugger program). Alternately or additionally, a fine grain tracing approach for any suitable nonnative skill may include tracking operations (e.g., memory operations, jump/branch operations, hardware operations) with hardware (e.g., executing the nonnative skill on specialized processor and/or memory hardware).

In general, interpreters, virtual machines, and/or compilers/linkers may be configured to achieve suitable coverage of all of the low-level and/or high-level programming language constructs that may occur in a nonnative skill. For example, programming language techniques (e.g., tests and/or theorem proving) may be used to verify that a fine grain tracing approach will appropriately record all computational steps that are performed during the execution of a program. In contrast, a coarse grain approach may only record computational steps that were explicitly traced via proxy objects. Accordingly, a fine grain approach may capture more details than a coarse grain approach.

Although fine grain tracing approaches may be implemented for many different programming languages, and although the fine grain tracing approach may record more detail than a coarse grain tracing approach, fine grain tracing approaches may also obscure and/or complicate some computational steps, by including an unnecessary level of detail. As an example, computational steps for accessing an API may include steps to save values in memory, access network hardware, and/or conduct API-specific business logic. However, it may be difficult for a conversational computing system to learn how to call the API based on the low-level steps. Furthermore, it may be difficult for a human demonstrator and/or engineer to understand the low-level steps, for example when validating the behavior of a conversational computing system, and/or editing annotated dialogues used for training a conversational computing system.

Accordingly, a hybrid approach may combine a coarse grain approach and a fine grain approach, to capture suitable high-level and low-level details of execution of a nonnative skill. Furthermore, automatically computer-tracing the computer operations performed by the nonnative skill may include automatically computer-tracing the computer operations via a hybrid approach that automatically records when the nonnative skill calls a function of a predefined plurality of functions, via a coarse grain tracing approach, and further automatically records computational events associated with calling any other function not among the predefined plurality of functions, via a fine grain tracing approach. For example, JavaScript tracing machine 116 uses hybrid tracing approach 116H combining a coarse grain tracing approach 116C and a fine grain tracing approach 116F. In a hybrid approach, a coarse grain approach is used to trace some functions, e.g., API calls, while a fine grain approach is used for other functions. As an example, functions that should be tracked using the coarse grain approach may be enumerated in a list of "opaque" functions, and/or indicated "opaque" using a source-level annotation. Invocation of opaque functions may be tracked in any suitable manner, for example by implementing a full coarse grain tracking approach using proxy objects as described above, and/or by configuring an interpreter, virtual machine, and/or compiler/linker to do fine grain tracking, while also coarsely tracking opaque functions without doing fine grain tracking. In some examples, coarse grain tracking of opaque functions may provide information that is potentially more relevant for training, e.g., it may be easier for a conversational computing system to learn how to call an API by invoking an API function by name, as compared to learning how to call the API by executing an appropriate sequence of low-level instructions to control networking hardware. Accordingly, the hybrid approach may represent high-level computational tasks at an appropriately high level (e.g., using the coarse grain approach for opaque functions) while achieving good coverage of all of the computational steps occurring in a program (e.g., by using a fine grain approach for non-opaque functions).

The coarse grain, fine grain, and/or hybrid approaches for tracing may be used to obtain data-flow traces for any suitable programs, for example, web applications, GUI programs, command line programs, and/or hard-coded skills/templates of conversational computing interfaces. Accordingly, the tracing approaches may be used to integrate a conversational computing interface with functionality of other, different conversational computing interfaces and any other programs. In particular, a native plan 150 may be used as an example of a computer-executable plan for training the conversational computing interface, along with an event.

Skill converting machine 110 may be used to obtain data-flow traces useable for training the conversational computing interface to generate computer-executable plans. The resulting computer-executable plans may be associated with exemplary events to make annotated dialogues. The associated events may be obtained in any suitable fashion. For example, an exemplary event may be associated with a suitable data-flow trace representing a suitable action for responding to the exemplary event. In some examples, events and associated data-flow traces may be obtained from humans. Alternately or additionally, events and associated data-flow traces may be obtained by executing nonnative skills, wherein the exemplary events are automatically determined based on inputs received by the nonnative skills.

As an example, events and associated data-flow traces may be obtained from humans by asking a human to provide an exemplary event, and then obtaining an exemplary data-flow trace by tracing the execution of a nonnative skill configured to respond to the exemplary event. For example, a human demonstrator may be shown the exemplary event, and asked to operate a nonnative skill to respond to the event (e.g., by configuring the nonnative skill to calculate values for responding to a user question, and/or invoking an API to respond to a user request). For example, the human demonstrator may operate a GUI program or a command line program. Accordingly, a data-flow trace obtained from tracing the program may be associated with the exemplary event and used as training data.

In another example, a human engineer may be shown an exemplary event and asked to write a custom computer program in a nonnative programming language of the human engineer's choice (e.g., any nonnative programming language supported by a skill converting machine according to the present disclosure). Accordingly, a data-flow trace obtained from tracing the custom computer program may be associated with the exemplary event and used as training data.

In some examples, a nonnative programming language may be extended by providing access to a function of the native programming language of the conversational computing interface. Accordingly, a nonnative skill may be implemented in the nonnative programming language using the function of the native programming language. For example, a human engineer may implement a nonnative skill as a custom computer program, while also using functionality that may be specific to the native programming language of the conversational computing interface. In some examples, the nonnative programming language may be extended (e.g., with a library) to support a plurality of different functions specific to the conversational computing interface. For example, the nonnative programming language may be extended with a function to execute data-flow programs associated with the conversational computing interface and return values from the conversational computing interface to the nonnative skill. Data-flow programs may be executed to use any suitable functions using the conversational computing interface (e.g., to receive input from users, make intelligent decisions by generating data-flow programs, and/or access a conversation history of past interactions between the conversational computing interface and users). For example, a native program function executable to access a conversation history of past interactions with the conversational computing assistant may be used by native and/or nonnative programs in any suitable fashion, for example, to retrieve relevant contextual information related to interactions between the conversational computing assistant and a user. Accordingly, the human engineer may be able to use their preferred programming language (e.g., including programming language constructs, idioms, libraries, and/or APIs that may not be available in the data-flow language), while also using functionality specific to the conversational computing interface. The provenance of data values (e.g., from the conversational computing assistant and/or any other nonnative skill) may be tracked in order to determine an overall trace of computational steps performed by both the nonnative skill and the data-flow program associated with the conversational computing interface.

The evaluation of conversational computing interface functions (e.g., interpreting data-flow programs) may be synchronous and/or asynchronous. For example, in some examples the native program function may be a synchronous native program function configured to return a result value to the nonnative program before continuing execution of the native program. In other examples, the native program function may be an asynchronous native program function configured to asynchronously yield control to the nonnative program, and to asynchronously supply a result value to the nonnative program via an asynchronous programming interface of the nonnative program. For example, an asynchronous function associated with the conversational computing interface may be evaluated by returning an asynchronous value to the nonnative skill (e.g., using any suitable technique, such as async/await, futures, promises, and/or continuation passing style). Such asynchronous computation may enable the nonnative skill to perform computations while the conversational computing interface waits asynchronously, for example on API results or responses from a user. For example, the asynchronous native program function may be an input function configured to receive an input (e.g., a button press, an utterance, or any other suitable input) from a user. For example, an asynchronous object may indicate a value that is not yet available and that may not become available until after multiple rounds of dialogue between a human and the conversational computing interface.

The generated native computer-executable plan may be used for any suitable purpose, for example for machine-learning training. As a non-limiting example, a computer-executable plan may be used along with an exemplary conversation event, as a labelled training example for supervised training, e.g., to train the conversational computing assistant to produce suitable computer-executable plans in response to the same or similar conversation events in the future. Accordingly, method 1000 may optionally further include automatically machine-learning training the conversational computing interface based on the native computer-executable plan and based on a conversational event associated with the native computer-executable plan. In some examples, native computer-executable plans may be assigned to exemplary events by humans. For example, human demonstrators and/or human engineers may be shown exemplary events and asked to assign, to an event, a native computer-executable plan generated according to method 1000 or any other techniques of the present disclosure, for example as implemented on a development computer for training a conversational computing assistant.

In some examples, an exemplary conversational event may be provided by a user (e.g., based on interaction between the user and a conversational computing interface, and/or based on explicitly prompting the user to supply the exemplary conversational event). Accordingly, method 1000 may further include presenting the exemplary conversational event to the same or another human user, in order to prompt such human user to guide the generation of a native computer-executable plan. As a non-limiting example, the exemplary conversation event may be presented to a human developer. Accordingly, method 1000 may further include prompting the human developer to author a nonnative program implementing a nonnative skill for responding to the exemplary conversational event. Accordingly, execution of the nonnative skill may be observed so as to automatically computer-trace the execution and automatically computer-generate a native computer-executable plan, so that the native computer-executable plan may be used along with the exemplary conversation event for machine-learning training. The human developer may be prompted to author the nonnative program in any suitable manner, for example by visually presenting a GUI prompt showing the exemplary conversational event.

In some examples, alternately or in addition to obtaining exemplary events from humans, events may be obtained based on the execution of a nonnative skill being traced, in addition to tracing the computational steps taken in response to such events. In some examples, a nonnative skill is configured to receive user input from a human user and to perform a task based on the received input. For example, based on an exemplary conversational event, a user may operate a GUI program, command line program, or any other program to complete a task to respond to the exemplary conversational event. More generally, a nonnative skill may be configured to respond to an exemplary conversational event by receiving user input from a human user, and to perform a task based on the user input. Accordingly, method 1000 may include recognizing an exemplary conversational event provided by a user, presenting the exemplary conversational event to a human demonstrator, and prompting the human demonstrator to provide user input to the nonnative skill, thereby causing the nonnative skill to perform the task to respond to the exemplary conversational event. The human demonstrator may be prompted to provide the user input in any suitable manner, for example by visually presenting a GUI prompt showing the exemplary conversational event, presenting a prompt via a text and/or spoken question, etc. Alternately or additionally, method 1000 may include automatically defining an exemplary conversational event based on automatically recognizing input data that is received by the nonnative skill during execution of the nonnative skill. For example, exemplary conversational events may be obtained by recognizing inputs to GUI and/or command-line programs, as is described in more detail below. In some examples, the nonnative skill is a GUI program, and the input data is associated with a GUI input field. In some examples, the nonnative skill is a legacy skill of an automated assistant. Accordingly, the input data may include an utterance that the legacy skill is configured to receive, as described further below.

For example, a program that receives input (e.g., via a command line, GUI, and/or in the form of events such as button presses, utterances, and/or gestures) may perform computational steps associated with each received input (e.g., an event for receiving a GUI input, and/or an event for receiving a speech utterance). Each computational step for receiving inputs may be associated with an exemplary event. Accordingly, exemplary events and associated data-flow program may be inferred automatically by tracing the execution of a nonnative skill (e.g., tracing the execution of a GUI program while a user performs a task using the GUI program, and/or tracing the execution of a skill/template of a conversational computing interface as the user interacts with the conversational computing interface) and automatically inferring, for each input received by the traced program, an exemplary event. Accordingly, an automated dialogue including the exemplary event and the data-flow program may be used for training a conversational computing system to perform similar tasks via conversation (e.g., to perform the task the user performed with a GUI by getting relevant inputs in a series of questions).

In particular, other conversational computing interfaces may support hard-coded skills/templates that include specific associated events. Accordingly, by training on annotated dialogues including the specific associated events and data-flow traces obtained from tracing execution of the skills/templates, a conversational computing interface according to the present disclosure may be extended to support new actions based on the hard-coded skills/templates, while potentially being able to generalize the new actions to apply in different, novel situations not contemplated in the design of the hard-coded skills/templates.

As described above, a conversational computing interface according to the present disclosure may be configured to generate actions specific to different events that occur, thereby responding appropriately in novel situations. In contrast, a different conversational computing interface may have many different skills/templates for performing different actions, but may be unable to apply the skills/templates in novel situations or generalize to perform actions not defined by the skills/templates. Accordingly, by using a skill converting machine 110 to generate data-flow traces based on the skills/templates of another, different conversational computing interface, a conversational computing interface according to the present disclosure may be trained to perform actions of the other, different conversational computing interface. Accordingly, the conversational computing interface may learn to perform many different actions, while also being able to apply the actions appropriately in novel situations.

APPENDICES A and B respectively include exemplary code and exemplary tests relating to tracing nonnative programming languages for conversational computing interfaces. Specifically, APPENDIX A includes functions for tracing JavaScript code, in order to produce data-flow traces indicating computations in the Harbor language, which is a data-flow programming language for conversational computing interfaces (e.g., a native programming language suitable for representing native plans for the conversational computing interfaces). For example, JavaScript tracing machine 116 may be implemented according to APPENDIX A. APPENDIX A includes functions defined in the Scala programming language. The exemplary implementations in APPENDIX A are non-limiting and similar functions may be defined, in Scala and/or any other suitable programming language. APPENDIX B defines test cases for validating the code in APPENDIX A. APPENDIX B is illustrative of intended functionality for an exemplary implementation. However, the techniques of the present disclosure are not limited to implementations which pass all of the tests in APPENDIX B. Tracing techniques according to the present disclosure may be specified and/or implemented in any suitable fashion, using current and/or state of the art software engineering and/or programming language techniques (e.g., compilers, interpreters, virtual machines, tests, and/or proving techniques.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 2:
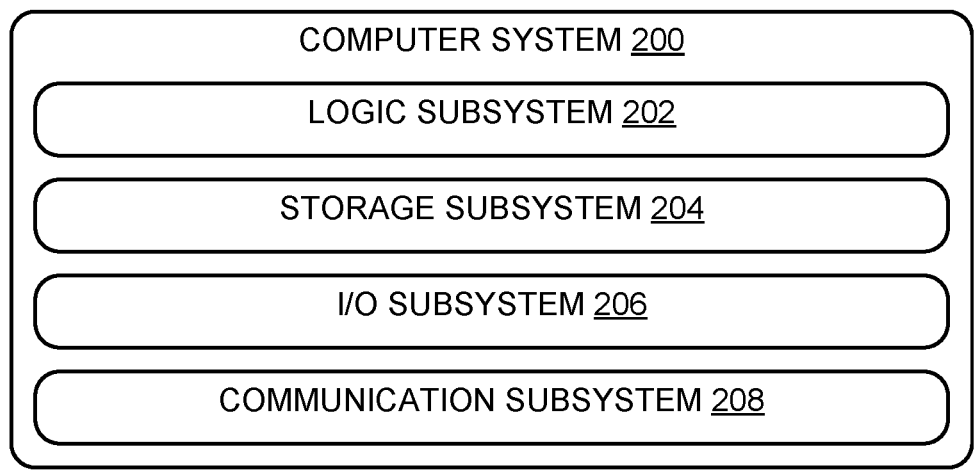
FIG. 2 shows an exemplary computing system.

FIG. 2 schematically shows a simplified representation of a computing system 200 configured to provide any to all of the compute functionality described herein. Computing system 200 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices.

Computing system 200 includes a logic subsystem 202 and a storage subsystem 204. Computing system 200 may optionally include an input/output subsystem 206, communication subsystem 208, and/or other subsystems not shown in FIG. 2.

Logic subsystem 202 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 204 includes one or more physical devices configured to temporarily and/or permanently hold computer information such as data and instructions executable by the logic subsystem. When the storage subsystem includes two or more devices, the devices may be collocated and/or remotely located. Storage subsystem 204 may include volatile, nonvolatile, dynamic, static, read/write, read-only, random-access, sequential-access, location-addressable, file-addressable, and/or content-addressable devices. Storage subsystem 204 may include removable and/or built-in devices. When the logic subsystem executes instructions, the state of storage subsystem 204 may be transformed—e.g., to hold different data.

Aspects of logic subsystem 202 and storage subsystem 204 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, input/output subsystem 206 may include one or more display devices utilizing virtually any type of technology. In some implementations, display subsystem may include one or more virtual-, augmented-, or mixed reality displays. which may be used to present a visual representation of data held by storage subsystem 204. This visual representation may take the form of a graphical user interface (GUI). Alternately or additionally, input/output subsystem 206 may include a speaker, which may be used to output an audible representation of data held by storage subsystem 204, for example, via speech output.

When included, input/output subsystem 206 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 208 may be configured to communicatively couple computing system 200 with one or more other computing devices. Communication subsystem 208 may include wired and/or wireless communication devices compatible with one or more different communication protocols. The communication subsystem may be configured for communication via personal-, local- and/or wide-area networks.

Machines may be implemented using any suitable combination of state-of-the-art and/or future machine learning (ML), artificial intelligence (AI), and/or natural language processing (NLP) techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or super-segmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

In an example, a method of extending a conversational computing interface, comprises executing a nonnative skill implemented in a nonnative programming language of the conversational computing interface. In this or any other example, the method further comprises automatically computer-tracing computer operations performed by the nonnative skill during such execution. In this or any other example, the method further comprises automatically computer-generating a native computer-executable plan representing the traced computer operations in a native programming language of the conversational computing interface. In this or any other example, automatically computer-tracing the computer operations performed by the nonnative skill includes automatically computer-tracing the computer operations via a coarse grain tracing approach that automatically records when the nonnative skill calls a function of a predefined plurality of functions, and automatically records results of calling the function. In this or any other example, automatically computer-tracing the computer operations performed by the nonnative skill includes automatically computer-tracing the computer operations via a fine grain tracing approach that automatically records computational events in an execution environment associated with the nonnative skill. In this or any other example, the nonnative skill includes a program configured for execution in an execution environment defined by a virtual machine, and wherein the fine grain tracing approach is implemented via configuring the virtual machine to automatically record each instruction executed by the virtual machine. In this or any other example, the nonnative skill includes a program configured for execution by compiling the program to machine instructions and executing the machine instructions in an execution environment associated with a computer processor, and wherein the fine grain tracing approach includes automatically recording each machine instruction executed by the computer processor. In this or any other example, automatically computer-tracing the computer operations performed by the nonnative skill includes automatically computer-tracing the computer operations via a hybrid tracing approach that automatically records when the nonnative skill calls a function of a predefined plurality of functions via a coarse grain tracing approach, and further automatically records computational events associated with calling any other function not among the predefined plurality of functions via a fine grain tracing approach. In this or any other example, the method further comprises extending a nonnative programming language by providing access to a native program function of the native programming language of the conversational computing interface, wherein the nonnative skill is implemented in the nonnative programming language using the native program function of the native programming language. In this or any other example, the native program function is executable to access a conversation history of past interactions with the conversational computing assistant. In this or any other example, the native program function is a synchronous native program function configured to return a result value to the nonnative program before continuing execution of the nonnative program. In this or any other example, the native program function is an asynchronous native program function configured to asynchronously yield control to the nonnative program, and to asynchronously supply a result value to the nonnative program via an asynchronous programming interface of the nonnative program. In this or any other example, the asynchronous native program function is an input function configured to receive an utterance from a user. In this or any other example, the method further comprises automatically machine-learning training the conversational computing interface based on the native computer-executable plan and a conversational event associated with the native computer-executable plan. In this or any other example, the method further comprises automatically recognizing an exemplary conversational event provided by a user, presenting the exemplary conversational event to a human developer, and prompting the human developer to author a nonnative program implementing the nonnative skill for responding to the exemplary conversational event. In this or any other example, the nonnative skill is configured to receive user input from a human user, and to perform a task to respond to the exemplary conversational event based on the user input, the method further comprising automatically recognizing an exemplary conversational event provided by a user, presenting the exemplary conversational event to a human demonstrator, and prompting the human demonstrator to provide user input to the nonnative skill, thereby causing the nonnative skill to perform the task to respond to the exemplary conversational event. In this or any other example, the method further comprises automatically defining the exemplary conversational event based on automatically recognizing input data that is received by the nonnative skill during execution of the nonnative skill. In this or any other example, the nonnative skill is a legacy skill of a legacy automated assistant, and wherein the input data includes an utterance the legacy skill is configured to receive. In this or any other example, the nonnative skill is a graphical user interface program, and wherein the input data is associated with a graphical user interface input field.

In an example, a method of extending a conversational computing interface comprises executing a nonnative skill implemented in a nonnative programming language of the conversational computing interface. In this or any other example, the method further comprises automatically computer-tracing computer operations performed by the nonnative skill during such execution, including automatically recording when the nonnative skill calls a function of a predefined plurality of functions, and automatically recording computational events associated with calling any other function not among the predefined plurality of functions. In this or any other example, the method further comprises automatically computer-generating a native computer-executable plan representing the traced computer operations in a native programming language of the conversational computing interface. In this or any other example, the nonnative skill includes a program configured for execution in an execution environment defined by a virtual machine, and wherein automatically recording computational events associated with calling any other function not among the predefined plurality of named functions includes configuring the virtual machine to automatically record each instruction executed by the virtual machine.

In an example, a computer system comprises a logic subsystem, and a storage subsystem holding instructions executable by the logic subsystem to observe execution of a nonnative skill implemented in a nonnative programming language of a conversational computing interface. In this or any other example, the instructions are further executable by the logic subsystem to automatically computer-trace computer operations performed by a nonnative skill implemented in a nonnative programming language of the conversational computing interface during execution of such nonnative skill. In this or any other example, the instructions are further executable by the logic subsystem to automatically computer-generate a native computer-executable plan representing the traced computer operations in a native programming language of the conversational computing interface.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The invention claimed is:

1. A method of extending a conversational computing interface, comprising:
   obtaining data-flow traces indicating computational steps occurring based on execution of a nonnative skill implemented in a nonnative programming language of the conversational computing interface, wherein obtaining the data-flow traces comprises tracing execution of the nonnative skill in response to an exemplary event;
   automatically generating a native computer-executable plan representing the data-flow traces in a native programming language of the conversational computing interface; and
   automatically training the conversational computing interface based on the native computer-executable plan and a conversational event associated with the native computer-executable plan.

2. The method of claim 1, further comprising:
   associating the native computer-executable plan with the exemplary event to generate an annotated dialogue; and
   automatically performing additional training of the conversational computing interface based at least on the annotated dialogue.

3. The method of claim 2, wherein automatically performing additional training of the conversational computing interface based at least on the annotated dialogue includes using the annotated dialogue as a labeled example for supervised training of the conversational computing interface.

4. The method of claim 2, wherein the annotated dialogue is associated with a data-flow trace representing a suitable action for responding to the exemplary event.

5. The method of claim 2, further comprising:
   querying a human user to provide the exemplary event.

6. The method of claim 5, further comprising:
   presenting the exemplary event to a different human user in order to prompt the different human user to provide input to guide generation of the native computer-executable plan.

7. The method of claim 2, wherein the data-flow traces are obtained by executing the nonnative skill and observing results of executing the nonnative skill.

8. The method of claim 7, wherein the exemplary event is automatically determined based at least on inputs received during execution of the nonnative skill.

9. A method of training a conversational computing interface, comprising:
   obtaining data-flow traces indicating computational steps occurring based on execution of a skill that is nonnative to the conversational computing interface, wherein obtaining the data-flow traces comprises tracing execution of the nonnative skill in response to an exemplary event;
   automatically training the conversational computing interface based at least on the data-flow traces to generate a trained conversational computing interface; and
   using the trained conversational computing interface, automatically computer-generating a computer-executable plan in a programming language that is native to the trained conversational computing interface.

10. The method of claim 9, further comprising:
associating the computer-executable plan with the exemplary event to generate an annotated dialogue; and
automatically performing additional training of the trained conversational computing interface based at least on the annotated dialogue.

11. The method of claim 10, wherein automatically performing additional training of the trained conversational computing interface based at least on the annotated dialogue includes using the annotated dialogue as a labeled example for supervised training of the trained conversational computing interface.

12. The method of claim 10, wherein the data-flow traces are obtained from a human user operating the nonnative skill.

13. The method of claim 12, further comprising:
prompting the human user to execute the nonnative skill in response to the exemplary event.

14. The method of claim 10, further comprising:
querying a human user to provide the exemplary event.

15. The method of claim 10, wherein the data-flow traces are obtained by executing the nonnative skill and observing results of executing the nonnative skill.

16. The method of claim 15, wherein the exemplary event is automatically determined based at least on inputs received during execution of the nonnative skill.

17. A computer system, comprising:
a logic subsystem; and
a storage subsystem holding instructions executable by one or more processors of the logic subsystem to:
obtain data-flow traces indicating computational steps occurring based on execution of a nonnative skill implemented in a nonnative programming language of a conversational computing interface, wherein obtaining the data-flow traces comprises tracing execution of the nonnative skill in response to an exemplary event;
automatically generate a native computer-executable plan representing the data-flow traces in a native programming language of the conversational computing interface; and
automatically train the conversational computing interface based on the native computer-executable plan and a conversational event associated with the native computer-executable plan.

18. The computer system of claim 17, wherein the storage subsystem further holds instructions executable by the logic subsystem to:
associate the native computer-executable plan with the exemplary event to generate an annotated dialogue; and
automatically perform additional training of the conversational computing interface based at least on the annotated dialogue.

19. The computer system of claim 18, wherein automatically performing additional training of the conversational computing interface based at least on the annotated dialogue includes using the annotated dialogue as a labeled example for supervised training of the conversational computing interface.

20. The computer system of claim 17, wherein the data-flow traces are obtained by executing the nonnative skill and observing results of executing the nonnative skill.

* * * * *